United States Patent [19]
Ostrander

[11] 3,803,909
[45] Apr. 16, 1974

[54] VEHICLE AND ENGINE TESTING APPARATUS

[75] Inventor: Robert F. Ostrander, Orange, Conn.

[73] Assignee: Ostradyne, Inc., Milford, Conn.

[22] Filed: Dec. 7, 1972

[21] Appl. No.: 313,121

[52] U.S. Cl. ................................................ 73/117
[51] Int. Cl. .......................................... G01m 17/00
[58] Field of Search ............ 73/117, 123, 124, 125, 73/126, 127

[56] References Cited
FOREIGN PATENTS OR APPLICATIONS
1,154,155  6/1969  Great Britain .................. 73/123
1,524,780  5/1968  France ........................... 73/117

Primary Examiner—James J. Gill
Assistant Examiner—Anthony V. Ciarlante
Attorney, Agent, or Firm—DeLio and Montgomery

[57] ABSTRACT

Lifting or climbing of a wheel when under test in a vehicle and engine dynamometer apparatus is prevented by the combination of a roll arranged with its axis generally parallel to the axes of paired rolls which support the wheel being tested, wherein the roll lifts when the wheel lifts from the paired rolls, and a switch connected to the dynamometer which de-energizes the dynamometer in response to lifting movement of the roll.

6 Claims, 5 Drawing Figures

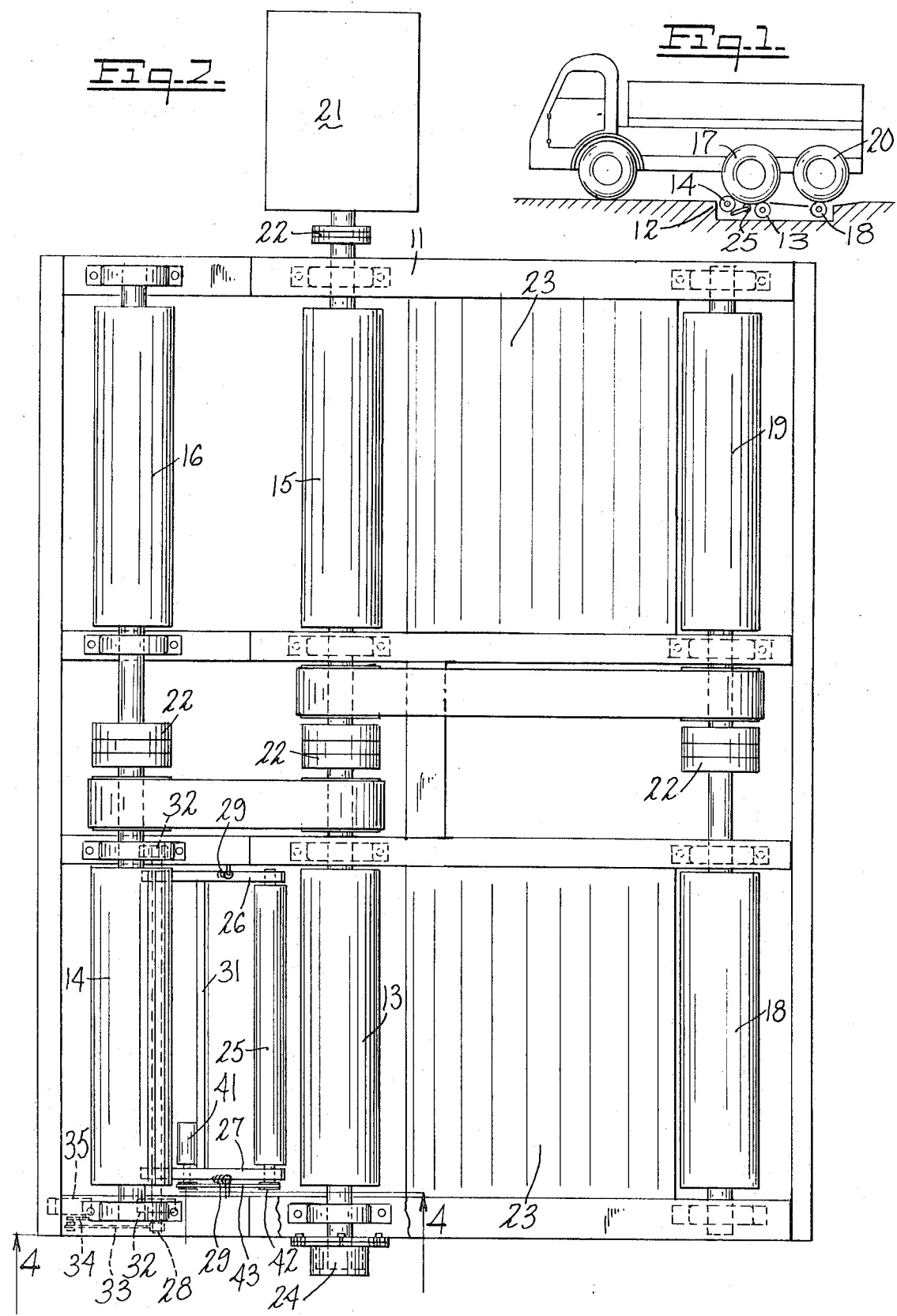

VEHICLE AND ENGINE TESTING APPARATUS

BACKGROUND OF THE INVENTION

This invention relates to a new and improved vehicle and engine testing apparatus wherein a power absorption device is used to test various performance factors such as horsepower output, braking power, and wheel alignment of motor vehicles such as automobiles, trucks and the like. More particularly, this invention relates to a new and improved dynamometer testing apparatus for the prevention of lift-off or climbing of wheels of the vehicle being tested.

Vehicle and engine testing apparatus has long been employed to test for performance and condition such as horsepower effective at the wheels of a vehicle, braking effectiveness, engine power output, and the effect of adjustments made on the engine while running. The dynamometers employed in such apparatus are of several types including absorption water brakes, prony brakes and electric brakes. Typical of the apparatus referred to is the apparatus disclosed in U.S. Pat. Nos. 3,286,517, 3,345,865 and 3,520,181.

A common problem in vehicle and engine testing apparatus is the tendency of driven wheels of the vehicle to lift or climb when the torque load placed by a dynamometer on rolls in contact with the wheels of the vehicle exceeds the opposing forces. It is a common practice to place chocks under stationary wheels of the vehicle or to use heavy restraining devices such as tie-bars or chains to prevent the vehicle from moving off the apparatus when a lift-off condition is reached. The excessive torque condition normally is not an intentional occurrence but is frequently encountered during testing. Sometimes, through foregetfulness or ignorance, the operator of the apparatus fails to employ the restraining means. As a consequence, the vehicle may suddenly move on the apparatus, resulting in serious damage or injury.

OBJECTS AND SUMMARY

Accordingly, an object of the invention is to provide new and improved vehicle and engine testing apparatus which includes a safety mechanism for avoiding the danger inherent in unexpected lift-off and climbing of the wheels of the vehicle during operation of such apparatus.

Still another object of the invention is to provide new and improved vehicle and engine testing apparatus which does not require the use of chocks, tie-bars, chains or other positive restraining means for avoiding the effects of excessive torque load placed on rolls of the apparatus by a dynamometer, but which becomes automatically responsive to such excessive loading so as to restore a safe condition of operation.

These and other objects, features and advantages of the invention will be apparent from the specification which follows.

In summary outline, the foregoing and other objects of the invention are achieved by an improvement in vehicle and engine testing apparatus, comprising means engageable with a wheel of the vehicle under test, which means is liftable with the wheel when through excessive torque the wheel lifts from the rolls of the apparatus during operation of same, in combination with means responsive to the lifting movement whereby the load on the dynamometer of the apparatus is changed so as to restore operative contact between the wheel and the rolls. In one embodiment of the apparatus, the means engageable with the wheel includes a roll arranged with its axis generally parallel to the axes of the rolls which support the wheel being tested, and the means responsive to the lifting movement comprises the switch connected to the dynamometer, which switch is adapted to de-energize the dynamometer in response to lifting movement of the roll with the wheel.

The invention accordingly comprises the features of construction, combination of elements, and arrangement of parts which will be exemplified in the construction hereinafter set forth and the scope of the invention will be indicated in the claims.

DETAILED DESCRIPTION

For a fuller understanding of the nature and objects of the invention, reference is had to the following description taken in conjunction with the accompanying drawings, in which:

FIG. 1 is a diagrammatic side view of a motor vehicle in contact with apparatus of the invention;

FIG. 2 is a partially diagrammatic top plan view of apparatus of the invention;

Figure 3:
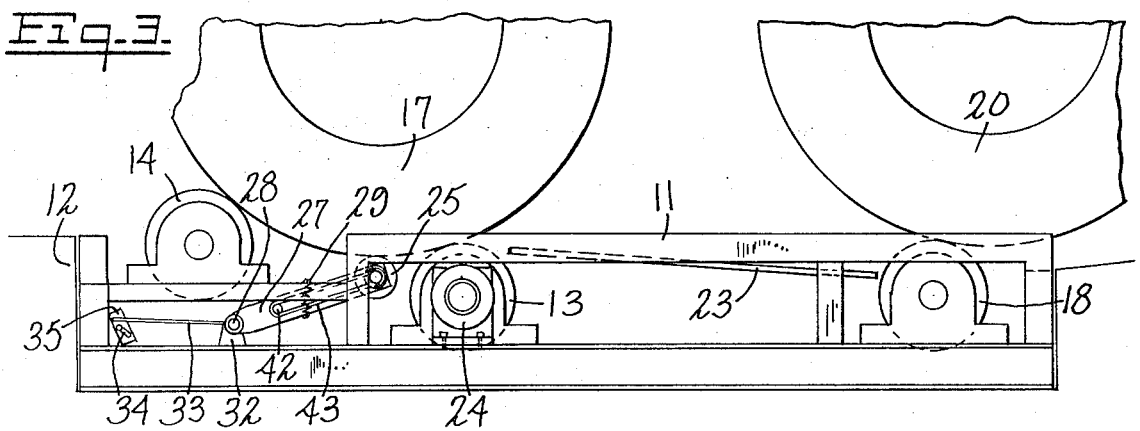
FIG. 3 is a partially diagrammatic side view of the same apparatus.

With reference to FIGS. 1-5, there are shown various structural elements comprising a typical vehicle and engine testing apparatus modified in accordance with the invention. Such conventional structural elements include a support frame 11 which is often housed below ground level in a concrete encasement 12. The frame 11 typically supports a plurality of rolls mounted on rotatable shafts connected to the frame, the rolls supporting and engaging the wheels of a vehicle under test. A pair of such rolls typically supports each wheel being tested. As shown, one pair comprises rolls 13 and 14 and a second pair comprises rolls 15 and 16. Rolls 13 and 14 support and are in operative engagement with wheel 17 of a vehicle under test (FIG. 1).

Other roller may be supported on frame 11 for operative or idler contact with other wheels of the vehicle under test, such as rolls 18 and 19 shown in contact with rear wheel 20 of the vehicle. Rolls 14 and 16 are interconnected with the main drive rolls 13 and 15, and at least one pair of opposing rolls, such as rolls 13 and 15, are connected to at least one dynamometer or power absorbing unit 21, through a coupling 22. Similar couplings 22 also may operatively connect other opposing pairs of the rolls, as shown. Typically, the testing apparatus also includes platforms 23 fixed between rolls 13 and 18, and 15 and 19, to facilitate movement of the vehicle onto and over the testing apparatus. A one-way clutch 24 may be provided, to permit rotation of roll 13 only in the clockwise direction indicated by the arrow in FIG. 4, so that the motor vehicle may be backed off the rolls after testing.

In operation, a motor vehicle is moved onto the apparatus so that a wheel 17 to be tested is in operative contact with rolls 13 and 14. For determination of engine power output, wheel 17 is driven and appropriate readings are made on a power absorption device such as dynamometer unit 21. In this conventional test, wherein dynamometer unit 21 is operated or "loaded" so as to provide a recordable torque to balance the torque of wheel 17, the restraining force of the load imposed on rolls 13 and 15 by dynamometer unit 21, particularly as the speed of wheel 17 decreases and the torque increases proportionately, will tend to gradually cause the wheel 17 to lift or climb off the rolls 13 and 15, unless the vehicle as a whole is restrained, as by the use of tie-bars, chains, chocks or the like.

One of the factors also restraining lift-off of wheel 17 is the weight of the vehicle. However, it will be evident that, in the absence of restraining devices such as chains or tie-bars, the stabilizing force of the vehicle's weight gradually lessens as the load on the rolls is increased by the loading of the dynamometer unit 21 required for measurement of power output of wheel 17. Consequently, tremendous torque forces are generated which, if not compensated for by weight of the vehicle or by restraining devices placed upon the vehicle, will cause the wheel under test to lift or climb from the rolls with possible injury to the operator and damage to the vehicle and test equipment. It will therefore be evident that a safety device which becomes operative automatically when the torque load imposed by the dynamometer exceeds the opposing forces of the vehicle will substantially lessen the danger inherent in the operation of such test apparatus.

The automatic safety mechanism incorporated in the above-described apparatus includes a means engageable with wheel 17 which lifts with the wheel when the wheel lifts from the rolls, together with means responsive to the lifting movement for changing the load on the dynamometer so as to restore operative contact between the wheel and the rolls. In one form, as illustrated in the Figures, the means engageable with the wheel is a roll 25 positioned with its axis generally parallel to the axes of rolls 13 and 14. Roll 25 is rotatably mounted between the ends of a pair of support arms 26 and 27. As more clearly shown in FIGS. 3–5, arms 26 and 27 are mounted on frame 11 so as to pivot vertically.

The roll 25 is held in contact with wheel 17 preferably by springs 29 mounted between frame 11 and each of arms 26 and 27. It will be evident that the arms 26 and 27 may be so biased by other means, whether hydraulic, electric or the like. A strut 31 affixed to arms 26 and 27 adds to the stability of engagement of roll 25 with wheel 17.

Figure 5:
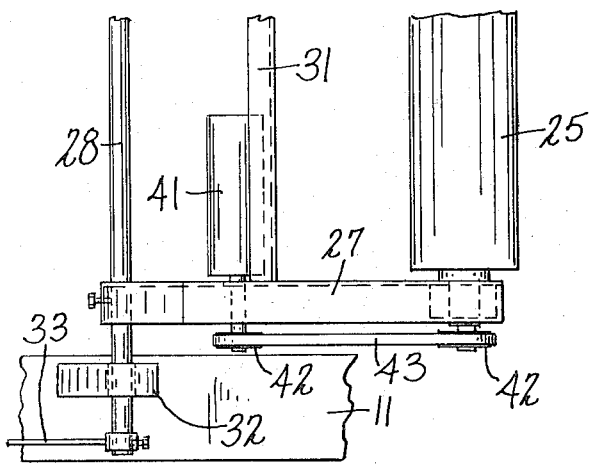
FIG. 5 is a partial, horizontal sectional view along the line 5—5 of FIG. 4.

The shaft 28 on which is carried arms 26 and 27 is mounted in bushings 32 (FIG. 5). To the end of shaft 28 is affixed a lever arm 33 arranged to pivot vertically upon rotation of shaft 28 caused by vertical pivoting of arms 26 and 27 when roll 25 lifts with wheel 17. The lever arm 33 thus contacts the throw arm 34 of a switch 35. The switch 35 is connected to dynamometer unit 21 in such fashion as to slow down, stop or otherwise de-energize the dynamometer when throw arm 34 is actuated.

Figure 4:
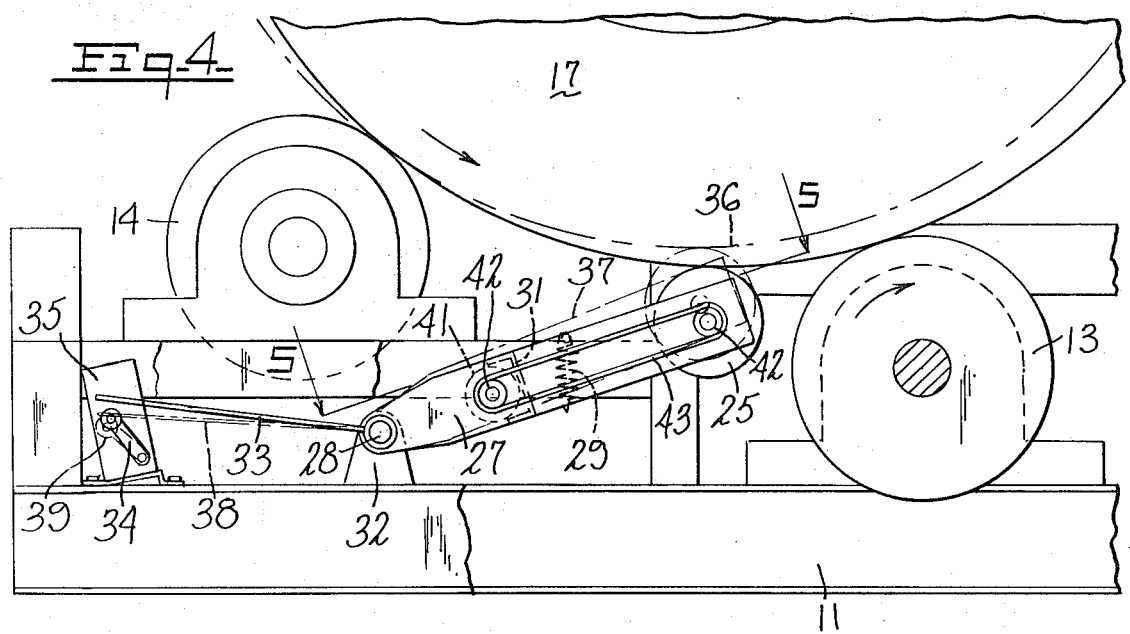
FIG. 4 is a somewhat enlarged, vertical sectional view along the line 4—4 of FIG. 2.

The operation of the foregoing safety mechanism is clearly evident in FIG. 4 where, upon lifting of wheel 17 to the position 36, roll 25 and the arms 26 and 27 also lift to position 37, and lever arm 33 and throw arm 34 move to corresponding positions 38 and 39. Upon the resulting interruption or change in the torque load imposed on rolls 13 and 15 by dynamometer unit 21, the reverse operation occurs (dynamometer unit 21 is de-energized) so as to restore operative contact between wheel 17 and rolls 13 and 15. The reverse operation of switch 25 takes place when dynamometer 21 has reduced the torquing load placed upon rolls 13 and 15 to the point where lift-off of wheel 17 is no longer a danger. Accordingly, excessive torquing forces which would cause lift-off are automatically compensated for and operation of the apparatus may be continued without danger.

The structural elements for automatically preventing accidents due to lift-off of wheels in a vehicle engine testing apparatus as described above may be further modified for use in testing various characteristics of a motor vehicle. As shown in FIGS. 3 and 5, and most clearly in FIG. 5, a tachometer generator or the like 41 may be mounted on strut 31. Through a pair of pulleys 42 and a belt 43 the device 41 measures the RPM's of the roll 25. The roll 25, acting as a "fifth wheel," may also be employed to measure the vehicle MPH for computations of horsepower. Accordingly, the improvement afforded by the invention extends not only to safety but also to additional measuring facilities.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understoood that the following claims are intended to cover all of the generic and specific features of the invention herein described, and all statements of the scope of the invention which, as a matter of language, might be said to fall therebetween.

What is claimed is:

1. In a vehicle and engine testing apparatus having a pair of rolls engageable with a wheel of a vehicle to be tested, having a dynamometer operatively connected to one of said rolls, and where a driving force is supplied to said rolls by said wheel, the improvement which comprises means engageable with said wheel and liftable therewith when said wheel through excessive torque resulting from said force lifts from said rolls during operation of said apparatus, and means responsive to said upward movement for changing the load on said dynamometer so as to restore operative contact between said wheel and said rolls.

2. Testing apparatus as in claim 1 wherein said means engageable with said wheel includes a roll arranged with its axis generally parallel to the axes of said pair of rolls, said means responsive to said movement including a switch connected to said dynamometer, said switch being adapted to de-energize said dynamometer in response to lifting movement of said roll with said wheel.

3. Testing apparatus as in claim 2 wherein said roll is spring-loaded for engagement with said wheel.

4. Testing apparatus as in claim 2 further including means connected to said roll for tripping said switch, a pair of arms positioned parallel for supporting said roll therebetween at the ends thereof, and a rotatable shaft supporting the other ends of said arms and arranged for pivoting of said arms vertically in response to lifting movement of said roll and wheel.

5. Testing apparatus as in claim 4 wherein said means for tripping said switch comprises a lever arm connected to said shaft and adapted to pivot as said shaft rotates in response to pivoting of said support arms, said lever arm being positioned to thereupon operatively contact said switch.

6. Testing apparatus as in claim 2 further including means connected to said roll for measuring mph.

* * * * *